United States Patent Office 3,284,160
Patented Nov. 8, 1966

3,284,160
TREATMENT OF RECYCLED MINERAL OIL IN THE PRODUCTION OF SODIUM HYDRIDE
William E. Milligan, Allison Park, Pa., assignor to Callery Chemical Company, Pittsburgh, Pa., a corporation of Pennsylvania
No Drawing. Filed Aug. 26, 1959, Ser. No. 836,848
7 Claims. (Cl. 23—204)

This invention relates to the process for the production of dimethoxyborane from the reaction of methyl borate with a mineral oil slurry of sodium hydride. More particularly, it relates to an improvement in the said process whereby the mineral oil can be recycled and satisfactorily reused.

The boron hydrides in general and diborane in particular have become more and more important in recent years in chemical technology. Diborane, for example, has been extensively used as an intermediate in the preparation of high energy boron fuels and in various commercial applications, for example, as a polymerization catalyst. Stimulating the increased use of diborane and products which can be derived from it has been the greatly improved process which has been developed for the preparation of diborane in which dimethoxyborane is first formed and then disproportionated into diborane and methyl borate.

The presently preferred method for the production of dimethoxyborane is described in the copending, coassigned application of Schechter, Shumway and Murchison, Ser. No. 780,626, filed December 15, 1958, now Patent No. 3,028,221. In this method, hydrogen is reacted under pressure and at elevated temperatures with sodium dispersed in mineral oil; the resultant slurry of sodium hydride in mineral oil is reacted with methyl borate in a distillation column to produce dimethoxyborane which is obtained overhead. Dimethoxyborane is usually recovered from the top of the column, although by adjustment of the reaction conditions it can be disproportionated into diborane and methyl borate in an upper portion of the column and diborane obtained directly from the top of the column.

This method for the production of dimethoxyborane has provided a relatively inexpensive source of diborane but has been found to be subject to certain difficulties. Thus, in continuous operation of the column it is desirable to recover the mineral oil from the column for use in preparing additional sodium hydride. However, the particles of sodium hydride produced in recycled mineral oil are 3 to 5 micron crystals whereas the particles of sodium hydride made in fresh mineral oil are 10 to 20 micron agglomerates. When the process is operated using sodium hydride made in recycled mineral oil, there takes place a gradual deposition of white solid at the feed plate area of the column, where the sodium hydride-mineral oil slurry enters and is contacted with the methyl borate. The solids deposition does not occur when the large particle size sodium hydride made in fresh mineral oil is fed to the column. The fouling thus encountered has limited the length of time during which the column can be operated on a continuous basis, and in order to overcome this problem has made it necessary to continually use fresh mineral oil in the hydriding of the sodium, with a resultant increase in the cost of this operation.

It is an object of this invention to provide an improvement in the above-described method for the production of dimethoxyborane whereby the mineral oil which is recovered from the column can be recycled and reused in the hydriding reaction.

Another object is to provide a material which can be used to treat the recovered mineral oil so as to render the treated mineral oil reusable in the hydriding of sodium.

A further object is to provide a method for the production of sodium hydride in recovered mineral oil whereby the particles of sodium hydride produced are relatively large.

Still other objects will become apparent from the following specification and claims.

This invention is based on the discovery that recovered mineral oil which has been treated with Panther Creek bentonite can be reused as the oil medium for the hydriding of sodium and that the reuse of oil treated in this manner produces a sodium hydride-mineral oil slurry which does not foul or cause plugging of the dimethoxyborane production column when used therein.

The action and mechanism by which the dimethoxyborane production column becomes fouled and solids are deposited therein is not definitely known. Studies which have been carried out on this problem have led to the surprising conclusion that a cause of the fouling may be that the sodium hydride which is produced using recycled and untreated mineral oil reacts too quickly in the dimethoxyborane column. This sodium hydride appears to be of smaller particle size, and thus more reactive, and apparently reacts so quickly as to permit the reaction to get out of control and to become superheated at the feed plate. When fresh mineral oil or mineral oil treated in accordance with this invention is used in the hydriding of sodium, the sodium hydride produced is coarser and appears to react slower with the methyl borate and little or no fouling at the feed plate area is encountered.

A number of materials, including several bentonite clays, were tested for use in the treatment of the recycled mineral oil. Of all the materials tested, only Panther Creek bentonite was effective in producing mineral oil which when used in the hydriding reaction produced sodium hydride which would not foul the dimethoxyborane column to an appreciable extent. The action of the Panther Creek bentonite upon the mineral oil is unknown, but it has been shown that mineral oil itself is essentially unchanged. It has been hypothesized that the action of the Panther Creek bentonite is to remove residual impurities, such as, for example, traces of methyl borate or reaction products of dimethoxyborane and mineral oil from the recycled mineral oil.

Panther Creek bentonite is a bentonite clay, light cream to light brown in color, which is obtained in northeastern Mississippi. It is a relatively non-swelling clay and is composed of about 85% montmorillonite. It has an average analysis as follows: $SiO_2$, 64.17%; $Al_2O$, 17.14%; $Fe_2O_3$, 4.81%; $CaO$, 1.48%; $MgO$, 3.9%; $Na_2O$, 0.21%; $K_2O$, 0.48%; ignition loss 7.78%.

The treatment of the recovered mineral oil is carried out by contacting the mineral oil with the Panther Creek bentonite. Stirring and agitation, while not necessary, aid in obtaining better contact and thus to complete the treatment in a lesser time.

The effectiveness of the Panther Creek bentonite treatment of the mineral oil depends to some extent upon the ratio of bentonite to oil used. It is preferred to use about one pound or more of Panther Creek bentonite to eight pounds of oil. This ratio has been found to produce sodium hydride which, for all practical purposes, completely eliminates the fouling problem in the feed plate area of the dimethoxyborane production column. Treatment of the oil with other ratios using less Panther Creek bentonite produces sodium hydride which is of a somewhat different shape and thus has a somewhat different surface area than does the treatment with the ratio which is preferred; however, the use of such sodium hydride in the production of dimethoxyborane also reduces fouling.

The treatment has been carried out at various temperatures, from room temperature up to temperatures over 150° C., with good results in each instance. It has been found, however, that the treatment which results in the best sodium hydride, i.e., that which produces the least fouling in the dimethoxyborane production column, is obtained, from treatment with Panther Creek bentonite at temperatures between about 130 to 150° C. Higher temperatures are not necessary, and it appears that the effect of lower temperatures is similar to that encountered when too small amounts of bentonite are used. That is, the sodium hydride produced in mineral oil treated at lower temperatures is of a somewhat different shape, and while it does not produce fouling in the dimethoxyborane production column to any substantial extent, it is not quite as effective as sodium hydride produced in oil which has been treated at the preferred temperatures.

In treating recovered mineral oil according to the preferred practice, mineral oil which has been recovered from the dimethoxyborane column is heated in a vessel to a temperature between about 130° and 150° C. One pound of Panther Creek bentonite for each eight pounds of recovered mineral oil is added to the vessel and the mixture is agitated, generally for about two hours. The oil is then filtered and stored until it is used in the hydriding reaction.

The hydriding reaction using the recovered and treated mineral oil is the same as the conventional method for preparing sodium hydride in which sodium and hydrogen are reacted in mineral oil at elevated temperatures, above about 250° C. In a typical run, the oil is charged into a reaction vessel at room temperature and then heated to about 260° C. under a 100 p.s.i.g. hydrogen atmosphere. The sodium is then charged to the reactor and the temperature is maintained between about 270° and 280° C. by the use of an internal cooling coil. When the reaction is completed the resulting slurry of sodium hydride in mineral oil is cooled and transferred for use in the dimethoxyborane reaction.

Tests in which the effectiveness of the Panther Creek bentonite treatment of recycled mineral oil was evaluated comprised the use of both recycled untreated mineral oil and recycled treated mineral oil in the dimethoxyborane production column. The tests were carred out in a thirty plate distillation column in which a sodium hydride-mineral oil slurry was fed into the column in the vicinity of plate 19 and methyl borate boiled up through the column from the reboiler. Contact of the sodium hydride-mineral oil slurry with the methyl borate took place at the feed plate, and dimethoxyborane was removed at the top of the column.

In one run carried out in the above described column, sodium hydride made in recycled mineral oil which had not been treated with bentonite was used. In this run, the concentration of sodium hydride in the feed slurry averaged 24.2%, and the methyl borate vapor rate to the column was 3500 pounds per hour. The methyl borate to sodium hydride boil-up ratio, i.e., the weight ratio of methyl borate vapor passing through the feed plate to sodium hydride fed onto the plate, was 200 to 1 and the reflux ratio was 9 to 1. The column was operated at a pressure of 2 to 4 p.s.i.g. This run was stopped after 14.75 hours when the plate above the feed plate fouled and plugged causing flooding in the column. After this area was cleaned, operation was resumed for an additional twenty-one hours when this area fouled again and caused a complete shutdown of the system. A total of 1830 pounds of dimethoxyborane was produced in the run.

In another run, essentially the same reaction conditions were used except that the sodium hydride used had been made in mineral oil which had been treated at 130° C. with a 1 to 8 weight ratio of Panther Creek bentonite. This run was carried out for sixty-one hours continuously. When the run was stopped at the end of that time 3020 pounds of dimethoxyborane had been produced and the feed plate area still had only negligible fouling.

These and other such tests have demonstrated conclusively that the treatment of the recycled mineral oil from the dimethoxyborane column with Panther Creek bentonite eliminates for all practical purposes the difficulty normally encountered, in that the feed plate area no longer becomes fouled and encrusted with white solid.

According to the provisions of the patent statutes, I have explained the principles and mode of practicing my invention and have described what I now consider to be its best embodiments. However, I desire to have it understood that, within the scope of the appended claims, the invention may be practiced otherwise than as specifically described.

I claim:
1. In a method of producing dimethoxyborane in which a slurry of sodium hydride is made from the reaction of hydrogen with sodium in mineral oil and then is reacted with methyl borate in a distillation column to produce dimethoxyborane which is continuously removed from the reaction zone, the improvement which comprises recovering the mineral oil from the column, treating the recovered oil by contacting it with Panther Creek bentonite and reusing the treated oil in the reaction in which sodium hydride is produced.

2. The improvement as a claim 1 in which the weight ratio of Panther Creek bentonite to recovered mineral oil is about 1:8.

3. The improvement as in claim 1 in which the treatment of the mineral oil with Panther Creek bentonite is carried out at a temperature between about 130 and 150° C.

4. A method of producing coarse sodium hydride which comprises reacting sodium with hydrogen at elevated temperatures in a mineral oil which has been recovered from a process in which sodium hydride in said oil was reacted with methyl borate and treated with Panther Creek bentonite.

5. A method for the treatment of mineral oil which has been recovered from a process in which sodium hydride was reacted with methyl borate which comprises contacting said recovered oil with Panther Creek bentonite and recovering the treated oil from the mixture.

6. A method in accordance with claim 5 in which the recovered oil is maintained at a temperature between about 130° C. and 150° C. during the time of contact.

7. A method in accordance with claim 5 in which about a 1:8 weight ratio of bentonite to oil is used.

References Cited by the Examiner
UNITED STATES PATENTS

| 1,958,012 | 5/1934 | Muckenfuss | 23—204 |
| 2,494,968 | 1/1950 | Schlesinger et al. | 260—462 |
| 2,758,060 | 8/1956 | Porter et al. | 208—251 |
| 2,829,950 | 4/1958 | Cunningham | 260—462 X |
| 2,852,435 | 9/1958 | Menk | 208—251 |
| 2,884,311 | 4/1959 | Huff | 23—204 |
| 2,926,186 | 2/1960 | Schechter et al. | 260—462 |

OTHER REFERENCES

Gregory, Uses and Applications of Chemicals and Related Materials, Vol. I, Reinhold Pub. Corp., New York, 1939, p. 86.

OSCAR R. VERTIZ, *Primary Examiner.*

LEON D. ROSDOL, *Examiner.*

L. A. SEBASTIAN, *Assistant Examiner.*